United States Patent [19]

Waugh

[11] 4,169,428
[45] Oct. 2, 1979

[54] PET SLEEPING BAG

[76] Inventor: Dorothy C. Waugh, 6170 Weatherly Dr. NW., Atlanta, Ga. 30328

[21] Appl. No.: 840,390

[22] Filed: Oct. 7, 1977

[51] Int. Cl.² ..................... A01K 1/02; A47G 9/00; A01K 13/00
[52] U.S. Cl. .................................. 119/1; 5/485; 119/156; 5/494
[58] Field of Search ............... 119/1, 19, 156; 5/343; 128/134

[56] References Cited

U.S. PATENT DOCUMENTS

| | | | |
|---|---|---|---|
| 622,812 | 4/1899 | Lapierre | 5/343 |
| 1,887,108 | 11/1932 | Steese | 119/19 |
| 2,032,248 | 2/1936 | Bins | 119/1 |
| 2,711,546 | 6/1955 | Licht | 5/343 X |
| 2,722,694 | 11/1955 | Bryant | 128/134 X |
| 2,775,222 | 12/1956 | Kruck | 119/1 |
| 2,854,948 | 10/1958 | Drayson | 119/1 |
| 3,125,663 | 3/1964 | Hoffman | 119/1 |
| 3,842,454 | 10/1974 | Young | 5/343 |
| 4,008,687 | 2/1977 | Keys | 119/1 |
| 4,008,688 | 2/1977 | Nicholas | 119/1 |

*Primary Examiner*—Hugh R. Chamblee
*Attorney, Agent, or Firm*—Jones, Thomas & Askew

[57] ABSTRACT

A sleeping bag for pets is formed from a multiple ply padded sheet of deeply quilted material which is normally folded along its central portion with opposite halves in overlying relationship to form lower and upper layers and with the edge portions of each half in alignment with each other. A closure means, such as a zipper, connects the overlying edge portions of the layers together to form an open-end bag with a pet entry opening at one end. A plurality of small air openings are formed in the edge portions of the layers with each air opening being of a size smaller than the appendage of the pet to use the bag, so that the air openings and the deeply quilted inside surfaces of the sleeping bag form air passages inside the sleeping bag and movement of the pet in the bag usually causes air to enter into and exhaust from the bag. An accessory attachment pocket is formed in the bag structure for the insertion of flea retardant chemicals, etc.

6 Claims, 3 Drawing Figures

PET SLEEPING BAG

BACKGROUND

Indoor pets, such as dogs and cats, sometimes have a favorite location in the house in which to sleep or rest. Sometimes these locations happen to be a soft chair seat, or a bed, or some other location about the house that is undesirable to the occupants of the house to have the pet habitually rest. As a result, many people have provided baskets, beds or other comfortable habitats for their pet, which usually are conveniently located for the pet and which are in a location out of the activity area for the humans in the household. While the prior art dog beds and other similar items are useful, they usually are made from hard material such as wicker or plastic with a soft insert such as a pillow or blanket material. These relatively rigid structures are sometimes inconvenient to handle when being transported in the family car, etc., and these structures usually do not provide a means for the pet to burrow under a layer of material to keep warm. The typical indoor pet frequently becomes used to household temperatures in the range from about b 65° to about 75° F., and exposure to lower outside temperatures on infrequent occasions, especially when the pet is required to sleep in low temperature areas, is likely to cause the pet to become chilled and more susceptible to animal sickness. This condition is more extreme when the animal is older and more susceptible to arthritis and other age oriented illnesses.

SUMMARY OF THE INVENTION

Briefly described, the present invention comprises a sleeping bag for animals, particularly for household pets, which comprises a multiple-ply padded sheet of deeply quilted material, normally folded along its central portion with opposite halves in overlying relationship with respect to one another to form lower and upper layers. The edge portions of each half are arranged in alignment with each other, and closure means, such as a zipper, connects the overlying edge portions of the layers together to form the material into an open-end bag shape, with the opening in one end forming a pet entry opening. A plurality of small air openings are formed in the edge portions of at least the upper layer, and each of the air openings is of a size smaller than the appendages of the pet which is to use a sleeping bag. An accessory pocket or attachment means is formed in the bag to receive a flea retardant chemical or deodorant. The air openings in combination with the deep quilting of the material from which the bag is made allows ready access of air movement into and out of the bag, so that any movement of the pet inside the bag tends to cause air to surge into and out of the air openings and throughout the bag, thereby providing oxygen to the pet if the pet should have its nose well inside the bag, and thereby providing air circulation to the body of the pet.

Thus, it is an object of this invention to provide a sleeping bag for animals, particularly for household pets, which is washable, portable, usable in and out of the house, and which provides comfort and warmth to the pet without tending to cause the pet to suffocate.

Another object of this invention is to provide an inexpensive and useful sleeping bag for household pets and the like, which is simple in design and inexpensive to construct and which is likely to be enjoyed by the typical household pet.

Other objects, features and advantages of this invention will become apparent upon reading the following specification, when taken in conjunction with the accompanying drawing.

DETAILED DESCRIPTION

Figure 1:
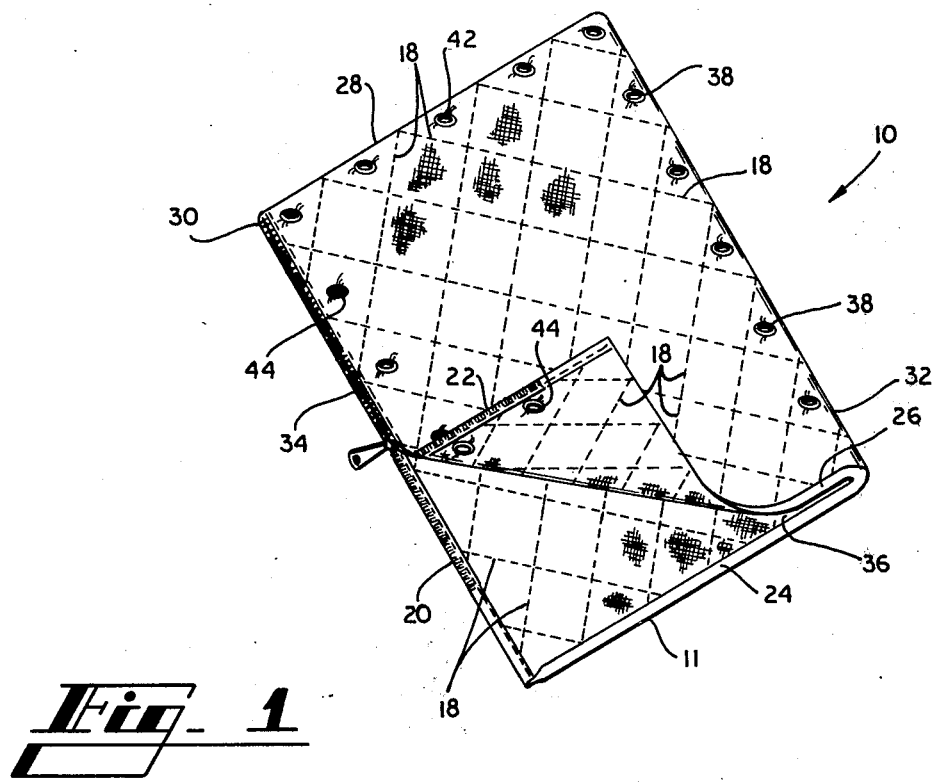
FIG. 1 is a perspective illustration of the pet sleeping bag.
Figure 2:
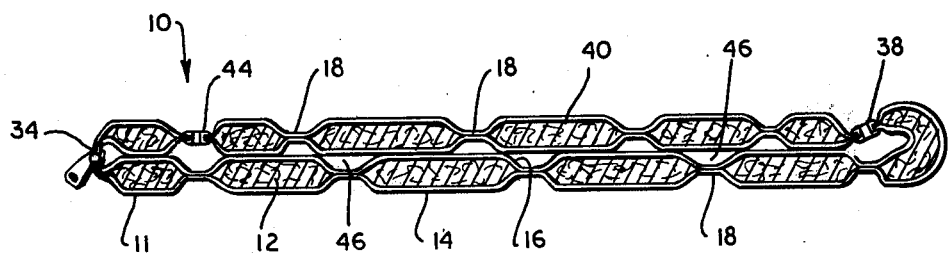
FIG. 2 is a side cross sectional view of the pet sleeping bag.

Referring now in more detail to the drawing, in which like numerals indicate like parts throughout the several views, FIGS. 1 and 2 illustrate a pet sleeping bag 10 which is fabricated from a single sheet of multiple ply materials 11. The particular material illustrated herein comprise an internal ply 12 of low density fibrous materials, such as cotton batting, an external or bottom ply 14 of water impervious material, such as rubberized canvas, and an upper or internal ply 16 of soft material, such as nylon. The layers 12, 14 and 16 are sewn together at their outer edges to form a single sheet of material, and the single sheet of material is quilted by sewing through the multiple plies as illustrated at 18.

The single sheet of material is usually folded in half so that its edges 20, 22 and 24, 26 and 28, 30 overlie one another in the manner illustrated in FIG. 1, which creates a centrally located fold 32. A closure means, such as zipper 34 is connected to the aligned edges 20, 22 and 28, 30, so that the material can be formed into an open-end bag shape with a pet opening 36 formed at one end. As illustrated in FIG. 1, the zipper 34 can be partially closed to leave a flap, or only one pair of edges can be zipped closed so as to leave two edges open, or the zipper can be left entirely open so that the sheet of material can be folded on a floor surface, etc. Usually, however, the zipper 34 will be completely closed, leaving only the opening 36 in the bag structure.

A plurality of air openings 38 are formed in the upper layer 40 adjacent the fold 32, a second plurality of openings 42 are formed in the upper layer 40 adjacent the foot of the sleeping bag, and a third plurality of openings 44 are formed in the side edge of the upper layer adjacent the zipper 34. The air openings 38, 42 and 44 are formed by metal grommets and the opening in each of the grommets is sized for the particular sleeping bag, with smaller bags having smaller openings and with larger bags having larger openings. It is anticipated that the smaller sleeping bags will be for smaller pets with smaller feet and other appendages, while the larger sleeping bags will be provided for larger pets with larger feet, etc. Thus, the air openings are sized so that they will be smaller than the appendages of the animal and the animal is therefore not likely to have its foot or other appendage inadvertently wedged into an air opening.

As illustrated in FIG. 2, the deep quilting formed by the stitching 18 forms air channels 46 that extend throughout the internal confines of the bag. These air channels 46 communicate with the air openings 38, 42 and 44, so that air is accessible to the confines of the bag. The zipper 34 is not air impervious, so that air can pass through the zipper as well as through the air openings 38, 42 and 44.

When a pet enters the sleeping bag 10, its usual mode of entry is to insert its nose in the opening 36, between the lower and upper layers of the sleeping bag, then to move inwardly of the bag. When the lower and upper halves of the bag are wedged apart by the pet's entry, air tends to enter the bag through the pet opening 36 and through the air openings and zipper of the bag. When the pet lies down inside the bag, the normal movements of the pet, including the act of breathing, tends to cause air to enter and egress from the bag, and the channels 46 formed by the deep quilting of the bag tends to allow the air to disperse throughout the bag. The usual circumstances are that the pet tends to enter the bag then turn around with its nose adjacent the opening 36 at the end of the bag, so that the pet breathes at the large end opening; however, should the pet choose to enter the bag and rest with its head near the foot of the bag, the several air openings and the air channels formed by the quilting of the bag provides a pet with enough oxygen to allow the pet to sleep safely without hazard of suffocation. While the air openings 38, 42 and 44 have been illustrated on three sides of the upper layer of the bag, it will be understood that the air openings can be formed in both the upper and lower layers of the bag, that more or fewer of the air openings can be formed in the bag structure, and that air openings can be provided adjacent the fold 32 without having to provide the air openings at the other edges of the bag because of the relatively porous zipper connection means. Moreover, the air openings in the disclosed embodiment of the pet sleeping bag have been located adjacent the periphery of the bag instead of in the areas where the pet is likely to rest, so that the hard grommet material used to form the air openings is not likely to be located in the vicinity where the pet wishes to rest on a soft surface.

Figure 3:
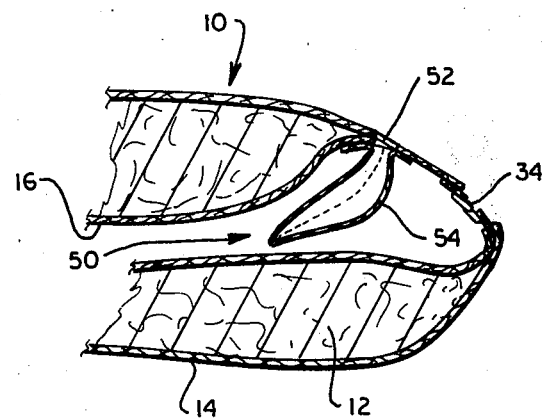
FIG. 3 is a detail illustration of the accessory pocket of the pet sleeping bag.

As illustrated in FIG. 3, a pocket structure 50 is formed internally of the bag structure, with the pocket opening 52 being formed through the layers of the sheet material and with the pocket 54 opening to the outside of the bag and extending into the confines of the bag. The pocket assembly 50 comprises means for attaching an accessory to the bag inside the bag, such as for attaching a solid chemical flea retardant or a deodorant to the sleeping bag.

While this invention has been described in detail with particular reference to a preferred embodiment thereof, it will be understood that variations and modifications can be effected within the spirit and scope of the invention as described hereinbefore and as defined in the appended claims.

I claim:

1. A sleeping bag for pets comprising a multiple ply padded sheet of deeply quilted material normally folded along its central portion with opposite halves in overlying relationship to form lower and upper layers and with the edge portions of each half in alignment with each other, closure means connecting the overlying edge portions of the layers of material together to form the sheet of material into an open-end bag-shape with a pet entry opening at one end, a first plurality of air openings formed adjacent the fold through the upper layer and a second plurality of air openings formed adjacent the side edge portion opposite the fold through the upper layer, each of said openings being of a size smaller than the appendages of the pet to use the sleeping bag, whereby the air openings and the deeply quilted inside surfaces of the sleeping bag form air passages inside the sleeping bag and movement of the pet inside the sleeping bag usually causes air to enter into and exhaust from the sleeping bag, and pocket means formed in said sleeping bag with the pocket opening on the outside surface of the sleeping bag and the pocket normally extending into the inside of the sleeping bag for receiving a solid flea retardant or the like.

2. The sleeping bag of claim 1 and wherein said closure means comprises means for connecting the edge portions of the layers of material together without sealing the edge portions together.

3. The sleeping bag of claim 1 and wherein said closure means comprises a zipper means.

4. The pet sleeping bag of claim 1 and wherein said air openings are located away from the central portion of the upper layer of the sleeping bag.

5. The sleeping bag of claim 1 and wherein the outside surface of said lower layer is fabricated from a substantially liquid impervious material.

6. A sleeping bag comprising a multiple ply padded sheet of deeply quilted material normally folded along its central portion with opposite halves in overlying relationship to form lower and upper layers and with the edge portions of each half in alignment with each other, closure means connecting the overlying edge portions of the layers of material together to form the sheet of material into an open-end bag-shape with an entry opening at one end, a plurality of air openings formed adjacent the fold through the upper layer of the sleeping bag away from the central portion of the upper layer of the sleeping bag whereby the air opening and the deeply quilted inside surfaces of the sleeping bag form air passages inside the sleeping bag and movement inside the sleeping bag usually causes air to enter into and exhaust from the sleeping bag.

* * * * *